Jan. 9, 1923. 1,441,231

G. L. LEWIS.
DEVICE FOR BREAKING, CONTRACTING, AND EXPANDING RIMS.
FILED NOV. 26, 1920.

INVENTOR
Guy L. Lewis

Patented Jan. 9, 1923.

1,441,231

UNITED STATES PATENT OFFICE.

GUY L. LEWIS, OF AKRON, OHIO.

DEVICE FOR BREAKING, CONTRACTING, AND EXPANDING RIMS.

Application filed November 26, 1920. Serial No. 426,523.

*To all whom it may concern:*

Be it known that I, GUY L. LEWIS, citizen of the United States, residing at Akron, in the county of Summit and State of Ohio, have invented certain new and useful Improvements in Devices for Breaking, Contracting, and Expanding Rims, of which the following is a specification.

This invention relates to devices for breaking, contracting and expanding rims, and it finds its particular adaptation in the removal of pneumatic tires from demountable rims of automobile wheels. It is designed to be clamped to the rim in the removal thereof and to remain upon the rim until the same is replaced.

It has for its object the provision of a tool of this character which will be simple and durable, inexpensive to manufacture and efficient in use. It has for a further object the improvement of the details of such a device, the production of a novel clamping element for the rim, capable of use upon a variety of rims, and the improvement of the tightening device of such a device.

Further objects and advantages of the invention will hereinafter appear in the following description and the novel features thereof will be particularly pointed out in the appended claims.

Figure 1:
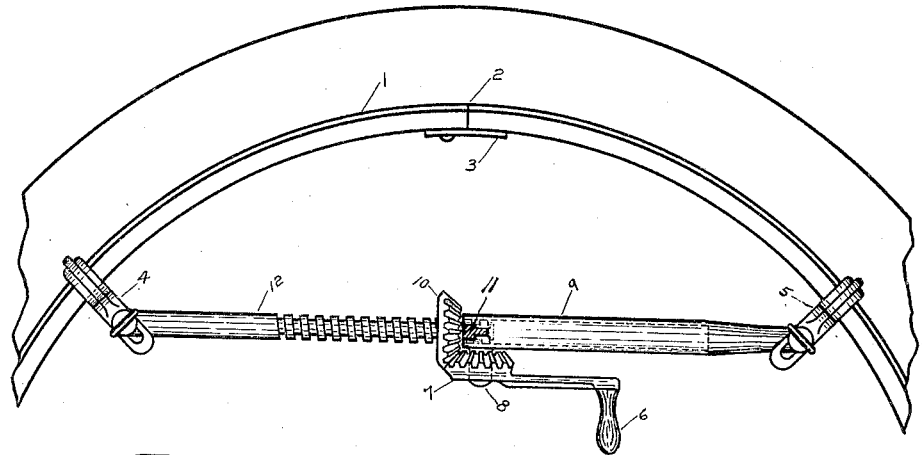
Figure 3:
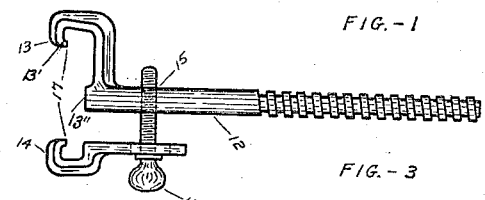
Figure 4:
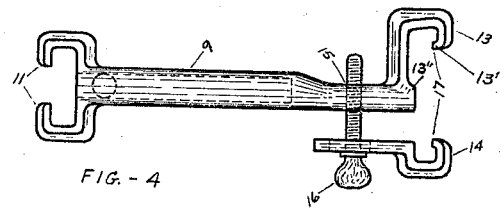
Figure 2:
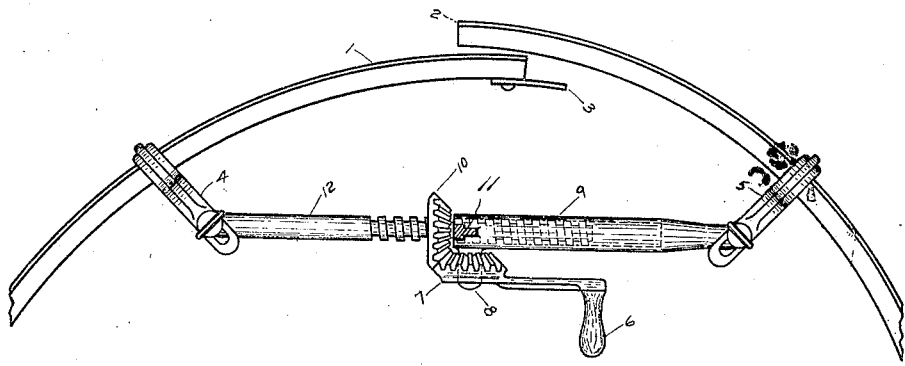

Referring to the accompanying drawings forming a part of this specification, in which like numerals designate like parts throughout the several figures, Figure 1 is a side elevation of the improved tool showing it applied to the demountable rim for the purpose of breaking or contracting the same, the gear holding member being shown removed for the purpose of more clearly illustrating the gear members, Figure 2 is a similar view showing the position of the parts after the joint has been broken, Figure 3 is a detail plan of one member of my device, and Figure 4 is a like view of the other member with the gears removed.

The numeral 1 indicates the rim of a tire commonly known as a demountable rim for automobile wheels, while the numeral 2 indicates the joint of such a rim and 3 the usual fastener therefor.

My improved breaking device consists of two members 9 and 12, telescoping one within the other, each member being provided with a clamp 4, 5, for secure attachment to the rim. Novel means are provided for securing a telescoping action between the members 9 and 12, and this means comprises generally a pair of intermeshing gears and a handle attached to one of said gears for causing rotation thereof. These members will now be described in detail and their conjoint operation set forth.

The body portion of the member 9 is bored for a portion of its length to receive the end of the member 12. One end of said body is bent at an angle as shown and is provided with an integral hook 13 adapted to take over the edge of the tire rim. Said hook forms one of a pair of gripping jaws, between which the rim is clamped, the other jaw being designated by the numeral 14. This jaw 14 overlies the jaw 13 and is controlled in its clamping action by means of a threaded bolt 16 passing through a threaded opening 15 in the member 9 at the bend thereof.

At the other end of said member 9 there is provided a pair of integral gear holding members 11, 11, and an integral bearing stud, upon which is rotatably mounted a gear 7. The numeral 6 represents a handle formed integral with the gear 7 and by means of which said gear is rotated in the operation of the device.

The member 12, like the member 9, is provided with a bend and with a pair of clamping hooks corresponding in details of construction to those just described in connection with the member 9. The body portion of said member 12 is provided with a screw thread upon which is adapted to be mounted the gear 10 provided with a corresponding interior screw thread. The gear 10 is held in intermeshing relation with the gear 7 by means of the holding members 11, 11, and by the end of the member 12 projecting into the bore of the member 9.

It will be seen that the making of the clamping hooks 13 integral with the body portions of the members 9 and 12 produces a stronger construction than is usual, and that the particular form of hook comprising the turned in point 13′ and the abutment 13″ adapts the device for use upon a variety of constructions of rims.

In the operation of the device, the parts are assembled as shown in Fig. 1 of the drawing, and the clamping hooks at the ends of the two members are applied to the rim and the securing bolts 16 tightened so that the rim is firmly gripped between the jaws of the clamps. The handle 6 is then rotated to cause rotation of the gears 7 and 10, which in turn will create a pull upon the members 9 and 12 so that they will telescope. This produces the necessary force to cause the breaking of the joint in the rim, as shown in Figure 2. In this condition of the parts, the pneumatic tire can be readily removed from the rim. The device is permitted to remain upon the rim until it is desired to replace the tire, when a reverse of the operations just described will cause the joint to be readily and quickly made.

While I have shown and described my preferred form of the invention, it will be understood that there may be other embodiments thereof, and that minor changes in the details of construction of the parts may be made without departing from the spirit of the invention as defined by the appended claims.

Having described my invention, what I claim as new and desire to secure by Letters Patent is:

1. A tire tool comprising an expansible and contractile body, the ends of which are bent at an angle and provided with integral rim-engaging hooks, abutments formed on said body in position to cooperate with said rim-engaging hooks to engage the rim, means for clamping the hook and the abutment to the rim, and means for expanding and contracting said body.

2. A tire tool comprising a pair of telescoping members, one of which comprises a tubular body portion having an integral rim-engaging hook at one end disposed at an angle thereto, the other of which comprises a screw threaded shank adapted to fit said tubular body and having an integral rim-engaging hook at its opposite end, means cooperating with the hooks of said members for firmly clamping them to the rim of a tire, a pinion mounted upon said screw threaded shank to rotate thereon, pinion retaining hooks upon said tubular body at the end opposite said integral rim-engaging hook, and means for rotating said pinion to cause the telescoping members to move to collapse or expand the tire rim.

In testimony whereof I affix my signature.

GUY L. LEWIS.